April 12, 1949.  J. E. COON  2,467,111

PLOW

Filed Jan. 2, 1946   2 Sheets-Sheet 1

Inventor
JOHN ELIJAH COON,
By Frank S. Appleman,
Attorney.

April 12, 1949.   J. E. COON   2,467,111
PLOW
Filed Jan. 2, 1946   2 Sheets-Sheet 2
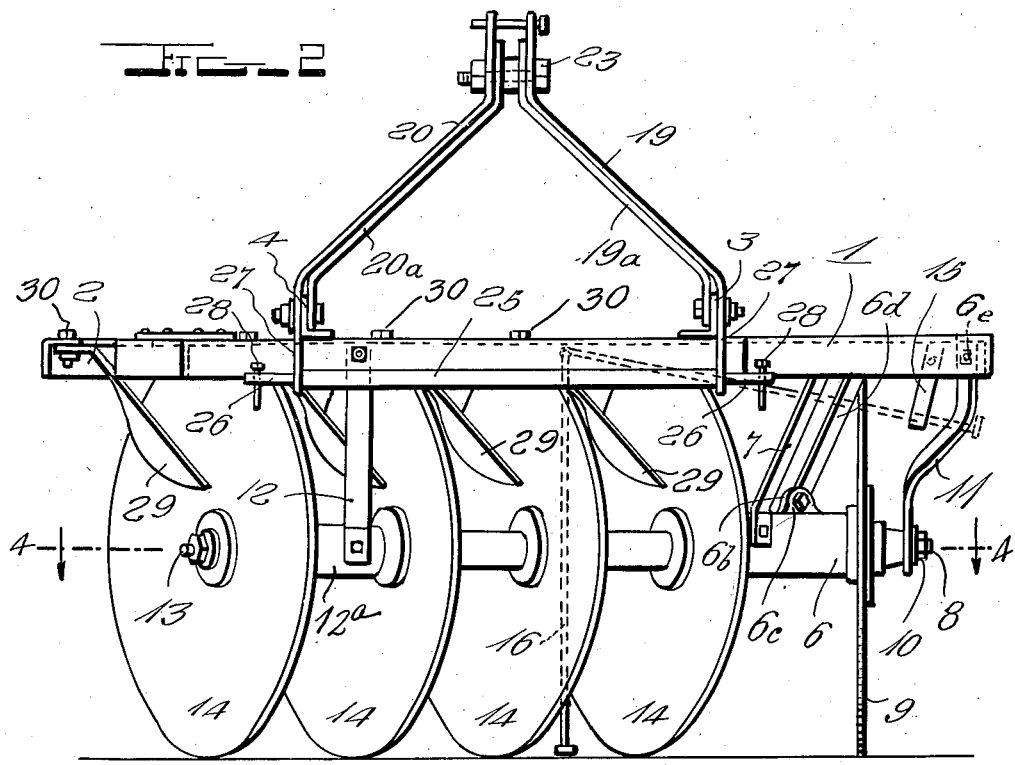
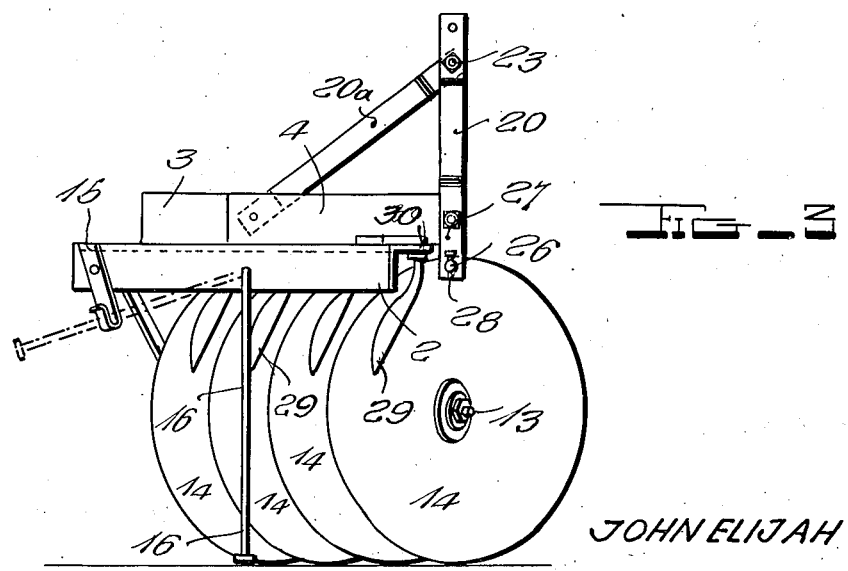
Inventor
JOHN ELIJAH COON,
By Frank L. Appleman
Attorney Patented Apr. 12, 1949

2,467,111

UNITED STATES PATENT OFFICE 2,467,111

PLOW

John E. Coon, Dozier, Ala.

Application January 2, 1946, Serial No. 638,629

1 Claim. (Cl. 97—53)

This invention relates to plows and it has direct relation to an implement in which the soil penetrating elements are in the nature of disks, a plurality of which is dished and mounted on a shaft diagonally disposed with relation to the direction of propulsion or travel thereof, an auxiliary disk being supplied, mounted on a shaft at an angle to the shaft on which the aforementioned disks are mounted; the said auxiliary disk being straight and the shaft on which it is rotatable being mounted at right angles to the direction of travel of the implement, the auxiliary disk serving to hold the implement against lateral thrust, due to the action of the first mentioned disks, and insuring that the implement shall travel in a straight line or in the direction of the line of draft.

It is a further object of the invention to provide a frame comprising comparatively few parts, from which hangers or brackets are suspended, which hangers or brackets have bearings for a shaft on which the dished disks are attached; and it is furthermore an object to provide a scraper for each of the dished disks, suspended from the frame and having their ends in contact with the convex surfaces of the dished disks and effective to dislodge accumulations of weeds or earth which might interfere with the effective operation of the implement.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 2 illustrates a view in front elevation;

Figure 3 illustrates an end view of the implement; and

Figure 1:
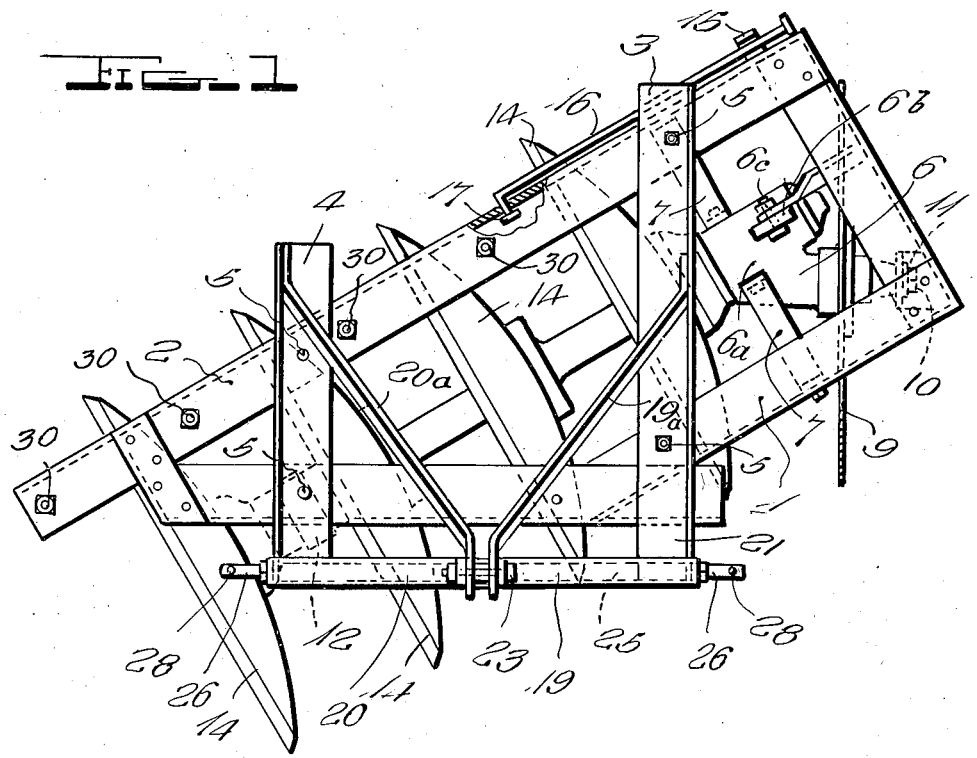
Figure 1 illustrates a plan view of an implement embodying the invention.
Figure 4:
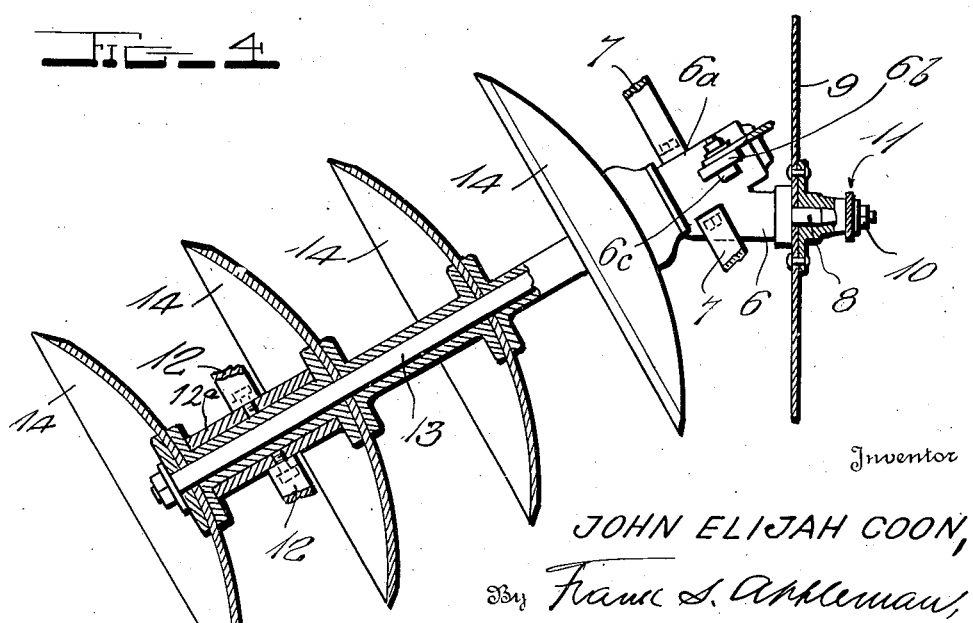
Figure 4 illustrates a sectional view on the line 4—4 of Fig. 2.

In these drawings a frame is shown comprising transversely disposed bars 1 and 2, one in front of the other, and cross members, in the nature of angle irons 3 and 4, which are attached to the first mentioned bars by suitable fastenings 5, such as bolts, or the like.

A bearing 6 is supported by arms, such as 7, which are attached to the said bearing, and their upper ends are secured to the frame. The bearing on its outer side has a bore or recess in which a stub shaft 8 is anchored, said stub shaft forming a trunnion for the colter disk 9, which is rotatable on the stub shaft and held thereon by a nut 10 threaded on the outer end of the stub shaft. A bracket 11 is anchored to the frame at 6e, and the stub shaft extends through an aperture in the lower end of the said bracket so that the stub shaft is braced and held rigid. The upper portion 6a of the bearing has ears 6b through which a bolt 6c extends for attaching a brace 6d to the ears, the said brace 6d depending from the frame.

Near the opposite side of the frame, a post or standard 12 has its upper end anchored to the frame by suitable fastenings and its lower end is attached to a bearing 12a. A shaft 13 is rotatable in the first mentioned bearing and it projects beyond the second mentioned bearing. The arrangement is such that the shaft is positioned diagonally with relation to the line of draft or movement of the implement, and a plurality of disks 14 is mounted on the shaft.

At the rear of the frame, a keeper 15 is suitably mounted, and a prop or support 16 has an angularly disposed end 17 extending through the bar 2, and the said prop swings to a vertical position, or it may be swung to a diagonal position, and its free end is supported by the keeper 15 attached to the bar.

Draft bars 19 and 20 have their inner ends anchored to the angle irons 3 and 4 forming a part of the frame, and the outer ends of the said draft bars may be supplied with any suitable hitch 23 for attachment to a tractor or for devices which are animal drawn, for the purpose of propelling or moving the implement during the plowing operations. The draft bars are held rigid by braces 19a and 20a, one end of each being attached to a frame member 3 or 4 and the other end attached to a draft bar. The lower ends 27 of the draft bars support a draft rod 25, whose ends 26 are to be engaged by connections to traces or other equipment used for hitching draft animals to the draft bearing, and 28 are pins or the like which serve to hold the horse drawn equipment on the said bar. Scraper blades 29 are suspended from the frame, as at 30, and they are positioned to engage the surfaces of the disks for removing deposits therefrom.

Since the colter disk 9 is straight, it acts as a guide to prevent lateral thrust of the implement when in operation, which lateral thrust is occasioned by reason of the fact that the dished disks are operating at an angle to the direction of travel of the implement.

An implement made in accordance with the foregoing description and illustration can be expeditiously managed by one person, and for cultivating or initial turning of the soil, as in plowing, it has proven effective and so rugged as to withstand unusual wear to which implements of this kind are subjected.

I claim:

A soil treating plow comprising a frame, bearings under the frame arranged diagonally with respect to the direction of travel of the cultivator, standards connecting the bearings and said frame, a shaft rotatably mounted in the bearings, cultivator disks on the shaft operating at an angle with respect to the direction of travel of the cultivator, an end bearing for the shaft having means by which it is connected to the frame, the said bearing having an arm diagonally disposed with respect to said bearing, a stub shaft carried by the arm, a coulter disk on said stub shaft, the angle of the stub shaft with respect to the main bearing being such that the disk on the stub shaft operates in the direction of travel of the frame, the last mentioned disk functioning to prevent lateral movement of the cultivator under the influence of the said diagonally disposed disks, a draft rigging attached to the frame disposed at an angle to the first mentioned shaft and in a direction parallel with the disk on the stub shaft.

JOHN E. COON.

REFERENCES CITED

The following references are of record in the file of this patent:

UNITED STATES PATENTS

| Number | Name | Date |
|---|---|---|
| 988,741 | Spalding | Apr. 4, 1911 |
| 1,193,314 | Trewhella | Aug. 1, 1916 |
| 2,177,423 | Wagner | Oct. 24, 1939 |
| 2,320,141 | Kott | May 25, 1943 |
| 2,336,152 | Rude | Dec. 7, 1943 |